United States Patent
MacLeod et al.

(10) Patent No.: US 6,660,937 B1
(45) Date of Patent: Dec. 9, 2003

(54) GROMMET FOR AUTOMOTIVE WIRING HARNESS

(75) Inventors: Lawrence J. MacLeod, Belleville, MI (US); Mark G. Hill, Novi, MI (US)

(73) Assignee: Yazaki North America, Canton, MI (US)

( * ) Notice: Subject to any disclaimer, the term of this patent is extended or adjusted under 35 U.S.C. 154(b) by 0 days.

(21) Appl. No.: 10/289,653

(22) Filed: Nov. 7, 2002

(51) Int. Cl.[7] .................................................. H02G 3/18
(52) U.S. Cl. ................ 174/65 G; 174/135; 174/152 G; 174/153 G; 174/655 S; 16/2.2; 248/56
(58) Field of Search .............................. 174/65 G, 65 R, 174/655 S, 152 G, 153 G, 135; 16/2.1, 2.2; 248/56

(56) References Cited

U.S. PATENT DOCUMENTS

| | | |
|---|---|---|
| 5,353,472 A | 10/1994 | Benda et al. |
| 5,545,854 A | 8/1996 | Ishida |
| 5,736,677 A | 4/1998 | Sato et al. |
| 6,206,331 B1 * | 3/2001 | Keith et al. ................. 248/74.1 |
| 6,297,457 B1 * | 10/2001 | Yamada et al. ....... 174/65 G X |

FOREIGN PATENT DOCUMENTS

| | | |
|---|---|---|
| JP | 2000-358317 | 12/2000 |
| JP | 2000-044839 | 2/2002 |

* cited by examiner

*Primary Examiner*—Dhiru R Patel
(74) *Attorney, Agent, or Firm*—Young & Basile P.C.

(57) ABSTRACT

A compounded injection molded plastic grommet including a rigid core and a soft elastomeric overmold defining a body portion with a soft elastomeric tube surrounding a portion of the wiring harness and exposed rigid plastic attachment tabs both fore and aft of the grommet body. The grommet and tube are split to allow side entry of the wiring harness and undercuts are provided at the top and bottom of the grommet for secure attachment to an automotive body structure. Final assembly involves putting the grommet in place and securing the wiring harness to the fore and aft attachment tabs by tape or plastic tie straps or the like.

18 Claims, 3 Drawing Sheets

GROMMET FOR AUTOMOTIVE WIRING HARNESS

FIELD OF THE INVENTION

This invention relates to automotive wiring harness grommets and more particularly to a compound-molded grommet which is useful in protecting an automotive wiring harness where it passes through an aperture in a metal structure such as an A pillar as well as providing a sound deadening function to prevent the transmission of noise and vibrations through the automotive body.

BACKGROUND OF THE INVENTION

Wiring harnesses of different sizes are used in automobiles to service various electronic components which pass through body structures such as firewalls and pillars. To protect the wiring harness from chafing and to close the aperture through which the harness passes, it is common to use grommets of rubber or elastomeric material. Within the context of this application, the term "grommet" is defined as a structure which serves as a fastening, support or reinforcement and is made of a moldable material such as plastic which is suitable to protect a wiring harness or bundle passing therethrough.

Grommets are typically made of a single material such as plastic or rubber and may be provided with peripheral slots or channels for attachment to a surrounding structure. Grommets made in several parts are shown in U.S. Pat. Nos. 5,545,854 and 5,736,677, assigned to Yazaki Corporation of Tokyo, Japan.

SUMMARY OF THE INVENTION

The present invention provides an improved grommet for the securement and protection of automotive wiring harnesses or bundles with the further objective of providing convenient places for secure attachment of the harness or bundle to the front and rear of the grommet. In general, the objectives of the invention are achieved by constructing an integral grommet made by compound or serial molding from two materials; i.e., a relatively rigid plastic such as polypropylene is used to make a core element, and a thermoplastic elastomer such as Santoprene® molded over the core element in such a way as to fully enclose most of the core, leaving forwardly and rearwardly extending attachment tabs exposed. The harness or bundle may, upon installation, be attached to the tabs both in front of and behind the grommet.

In the preferred and illustrative embodiment, the body portion is designed as a frame with interior openings to reduce the quantity of material needed and with a side opening or slot to receive a wiring harness therein. The elastomeric overmold is designed to provide a harness receiving tube which is aligned with the side opening slot which tube extends in the forward direction adjacent and over a forwardly extending attachment tab. The tube in the overmold is split, either in the original molding process or in a secondary operation, so that the wiring harness can be slipped into the grommet before the grommet is attached to a metal structure designed to receive it. The elastomeric overmold has a soft, pliable, peripheral lip on the interior side to lie against a surface of the metal structure. Top and bottom slots or undercuts hold the grommet in place.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATED EMBODIMENT

Figure 1:
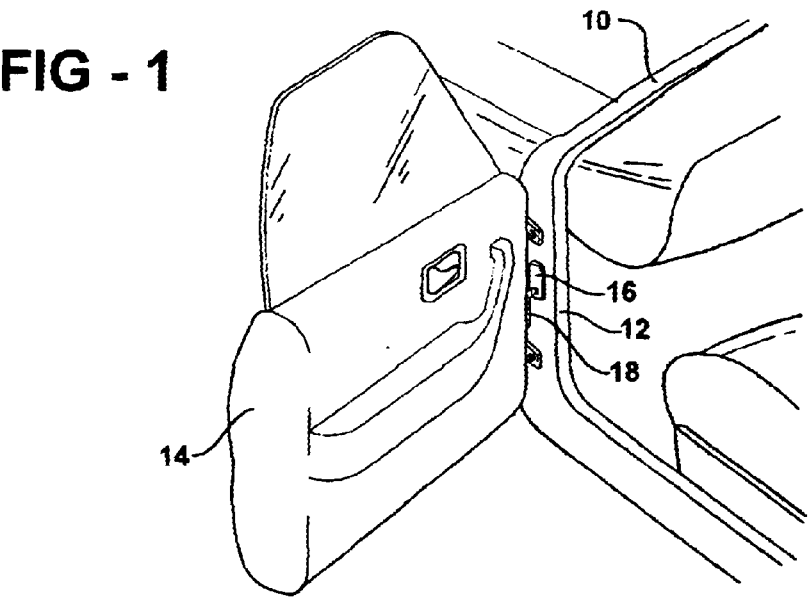
FIG. 1 is a perspective view of a portion of an automobile body, particularly the driver's door and A pillar, showing the location of a grommet constructed in accordance with the present disclosure.

FIG. 1 shows a portion of an automobile body 10 including an A pillar 12 to which a driver's side door 14 is pivotally attached. A grommet 16 protects a wiring harness 18 which passes through an aperture in the A pillar 12.

Figure 2:
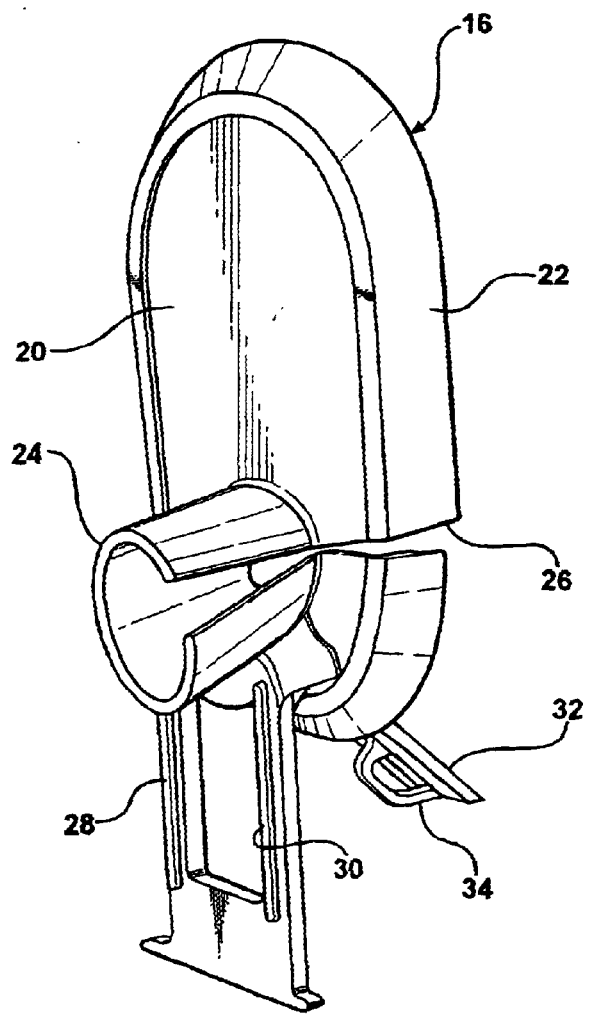
FIG. 2 is a perspective view of a complete grommet constructed in accordance with the present disclosure.
Figure 3:
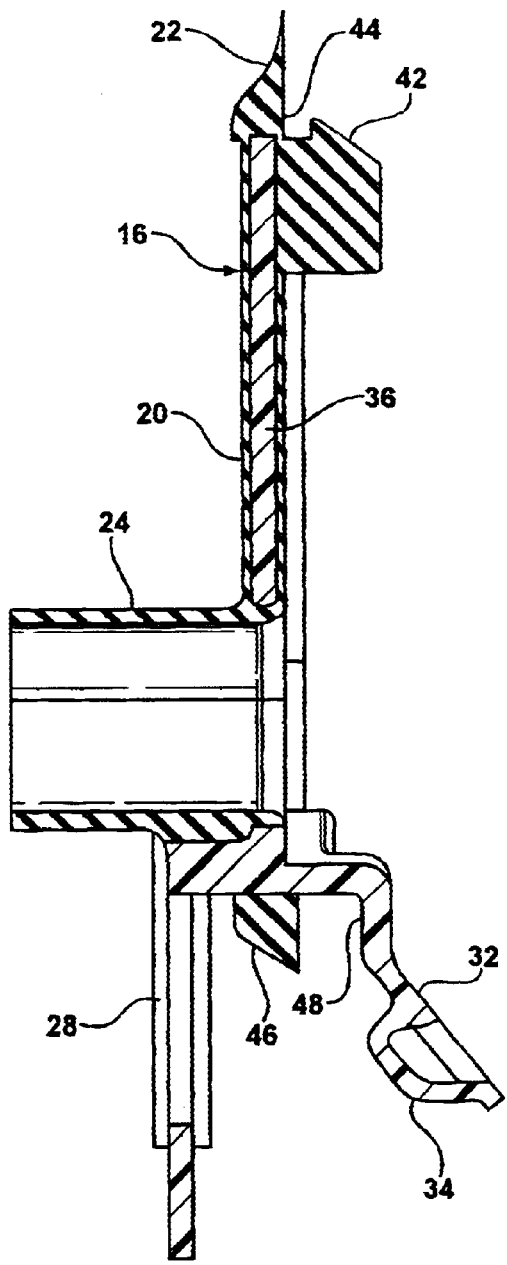
FIG. 3 is a side view, partly in section, of the grommet of FIG. 2.
Figure 4:
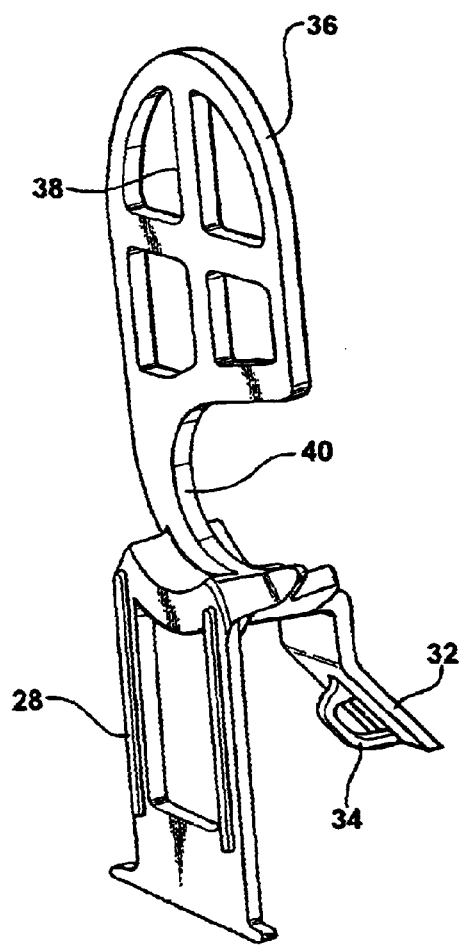
FIG. 4 is a perspective view of a rigid plastic core element used in the grommet of FIGS. 2 and 3.
Figure 5:
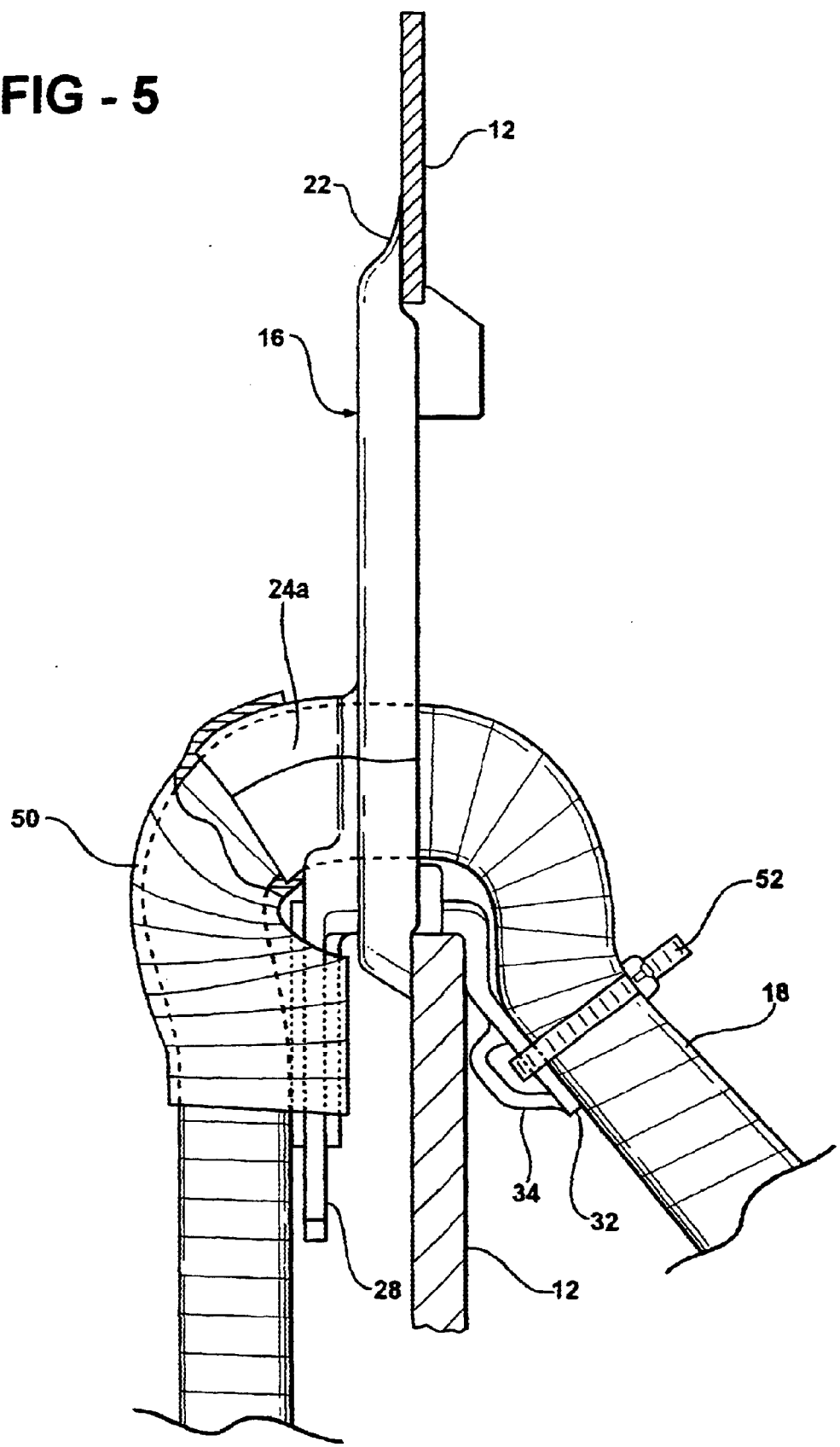
FIG. 5 is a side view, partly in section, of the combination of a wiring harness and grommet installed in an aperture in a metal structure such as an automotive A pillar.

Referring to FIGS. 2–4, the grommet 16 is a compound or serially molded structure comprising an elliptical body portion 20 having a planar face with a soft peripheral lip 22 and a forward extending tubular portion 24. The body 20 and the tube 24 are both slit at 26 to provide a side entry for the wiring harness 18 prior to installation of the grommet 16 in the automobile body 10 as shown in FIG. 1. A forward attachment tab 28 extends downwardly from the body 20 of the grommet 16, is frame-like in configuration and is provided with ridges 30 for stiffening purposes. A rearwardly extending attachment tab 32 extends outwardly and downwardly from the body 20 at an angle and is provided with an attachment loop 34 to receive a plastic tie strip as illustrated in FIG. 5.

Looking now at FIGS. 3 and 4, the grommet 16 is seen to comprise a relatively rigid core element 36 of injection molded polypropylene or an equivalent plastic. The upper portion of the core element 36 is essentially oval shaped to define the basic structure of the grommet body 20 and is provided with interior openings 38 to reduce the amount of material required. The core element 36 is further provided with a side opening slot 40 to permit a wiring harness to be pushed into the center of the resulting grommet 16 after a compound molding process hereinafter described has been completed. The core element 36 is further integrally molded with the forwardly and outwardly extending attachment tab 28 and the rearwardly and angularly extending attachment tab 32.

As best shown in FIG. 3, the body 20 of thermoplastic elastomeric material is injection molded over the core element 36 to essentially fully enclose the upper frame portion of the core element while leaving the forward and rearward attachment tabs 28, 32, respectively, exposed. A solid block 42 of thermoplastic material defines, in combination with the peripheral lip 22, an undercut or slot 44 at the upper portion of the grommet 16 for attachment to a sheet metal structure as shown in FIG. 5. The bottom peripheral portion 46 of the overmold provides a lower slot or undercut 48 to receive another portion of the metal structure 12 which, in this case, is thicker than the upper portion of the metal structure as shown in FIG. 5. The tube 24 is made entirely of thermoplastic elastomeric material and is, therefore, soft and pliable as is the peripheral lip 22 of the grommet 16 as previously described. The grommet body 20 and the tube portion 24 are split longitudinally to allow entry of the harness 18 to be pushed into the grommet 16 during assembly.

For installation, the wiring harness or bundle 18 is slipped into the grommet 16 facing in the proper direction. The grommet 16 is then forced by pressure or by pounding into an aperture in the vehicle A pillar 12 such that the upper metal structure extends into the undercut 44 and the lower metal structure extends into the undercut 48. The soft elastomeric lip 22 conforms to the exterior of the metal structure and provides a dust seal as well as an acoustic block. Tape 50 is applied by wrapping around the wiring harness 18 and the forward attachment tab 28 as shown in FIG. 5 causing the soft, pliable tube to bend downwardly as shown at 24*a*. A plastic locking tie 52 is inserted through the loop 34 and around the wiring harness 18 to secure the harness to the rear attachment tab 32 as also shown in FIG. 5. The wiring harness 18 thus assumes substantially a hairpin configuration as it passes through the grommet 16, the angles of which are purely for purposes of illustration and may be greater or lesser than the angles shown. Indeed, the attachment tabs 28, 32 can be essentially co-planar to accommodate a relatively straight wiring harness or bundle as it passes through an automotive structure.

It will be understood that the invention has been described with reference to an illustrative embodiment and that various modifications and changes in size, shape, configuration, and materials will be apparent to those skilled in the related arts.

What is claimed is:

1. A grommet for protecting an automotive wiring harness passing through an aperture in a metal structure comprising:
    a rigid molded plastic core element having a body portion with a forward extending harness attachment tab and a rearward extending harness attachment tab; and
    a thermoplastic elastomeric overmold encasing the body portion of the core element while leaving the harness attachment tabs exposed and defining a pliable tube extending through the body portion adjacent the forward extending harness attachment tab to receive the harness therein.

2. The grommet defined in claim 1 wherein the body portion has a planar frame portion with a side entry slot and the tube is split to permit insertion of the wiring harness through the side entry slot and into the tube.

3. The grommet defined in claim 1 wherein the forward extending attachment tab is molded in the form of an open frame with stiffening ribs.

4. The grommet defined in claim 3 wherein the forward extending tab is rectangular.

5. The grommet defined in claim 1 wherein the rearward extending tab extends away from the body portion at an acute angle.

6. The grommet defined in claim 5 wherein the rearward extending tab is provided with a tie loop.

7. The grommet defined in claim 1 wherein the elastomeric overmold has a soft peripheral lip on the same side as the rearward extending tab.

8. The grommet defined in claim 1 further including means integral with an elastic overmold forming an upper rearward extending retainer member for receiving an edge of the metal structure to which the grommet is attached.

9. The grommet defined in claim 8 wherein the rearward extending attachment tab is configured to provide a lower retainer means for receiving an edge of the metal structure between the rearward extending attachment tab and the elastomeric overmold.

10. In combination, an automotive wiring harness and a grommet for protecting the harness as it passes through an aperture in a metal structure wherein the grommet comprises:
    a rigid molded plastic core element having a body portion with a forward extending harness attachment tab and a rearward extending harness attachment tab; and
    a thermoplastic elastomeric overmold encasing the body portion of the core element while leaving the harness attachment tabs exposed and defining a pliable tube extending through the body portion adjacent the forward extending attachment tab to receive the harness therein.

11. The grommet defined in claim 10 wherein the body portion is a planar frame with interior openings and has a side entry slot and the tube is split to permit insertion of a harness through the side entry slot and into the tube.

12. The grommet defined in claim 10 wherein the forward extending attachment tab is molded in the form of an open frame with stiffening ribs.

13. The grommet defined in claim 12 wherein the forward extending tab is rectangular.

14. The grommet defined in claim 10 wherein the rearward extending tab extends away from the body portion at an acute angle.

15. The grommet defined in claim 14 wherein the rearward extending tab is provided with a tie loop.

16. The grommet defined in claim 10 wherein the elastomeric overmold has a soft peripheral lip on the same side as the rearward extending tab.

17. The grommet as defined in claim 10 further including means integral with the elastic overmold forming an upper rearward extending retainer member for receiving an edge of the metal structure to which the grommet is attached.

18. The grommet defined in claim 17 wherein the rearward extending attachment tab is configured to provide a lower retainer means for receiving an edge of the metal structure between the rearward extending attachment tab and the elastomeric overmold.

\* \* \* \* \*